United States Patent
Jöngren et al.

(10) Patent No.: US 9,059,762 B2
(45) Date of Patent: *Jun. 16, 2015

(54) METHOD AND ARRANGEMENT IN A WIRELESS COMMUNICATIONS SYSTEM

(71) Applicant: Telefonaktiebolaget L M Ericsson (publ), Stockholm (SE)

(72) Inventors: George Jöngren, Sundbyberg (SE); Bo Göransson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,699

(22) Filed: May 12, 2014

(65) Prior Publication Data

US 2014/0247773 A1    Sep. 4, 2014

Related U.S. Application Data

(63) Continuation of application No. 12/522,851, filed as application No. PCT/SE2007/050754 on Oct. 18, 2007, now Pat. No. 8,724,543.

(30) Foreign Application Priority Data

Jan. 12, 2007 (SE) ..................... 0700062

(51) Int. Cl.
*H04L 12/28* (2006.01)
*H04B 7/06* (2006.01)
*H04L 1/00* (2006.01)

(52) U.S. Cl.
CPC ............ *H04B 7/0639* (2013.01); *H04B 7/0632* (2013.01); *H04B 7/0634* (2013.01); *H04B 7/0658* (2013.01); *H04L 1/0001* (2013.01); *H04L 1/0025* (2013.01); *H04L 1/0028* (2013.01)

(58) Field of Classification Search
None
See application file for complete search history.

(56) References Cited

U.S. PATENT DOCUMENTS

| | | |
|---|---|---|
| 2005/0020237 A1* | 1/2005 | Alexiou et al. ............... 455/403 |
| 2007/0010957 A1* | 1/2007 | Sampath et al. ................ 702/57 |
| 2007/0124189 A1* | 5/2007 | Stoughton et al. ................ 705/8 |
| 2008/0004029 A1* | 1/2008 | Moilanen ....................... 455/450 |
| 2009/0005109 A1* | 1/2009 | Nishio et al. ............... 455/550.1 |
| 2009/0129502 A1* | 5/2009 | Tong et al. .................... 375/299 |

OTHER PUBLICATIONS

Texas Instruments, "Further Details on Codebook-Based Pre-coding for E-UTRA", 3GPP TSG RAN WG1 47bis, Jan. 15-19, 2007, pp. 1-5, Sorrento, Italy, R1-070270.

* cited by examiner

*Primary Examiner* — John Blanton
(74) *Attorney, Agent, or Firm* — Coats & Bennett, PLLC

(57) ABSTRACT

A method for assisting the adaptation of a signal from a first node to a second node is provided. The first node communicates with the second node in a wireless communication system over a radio link. The second node has a codebook comprising a set of possible information alternatives for assisting the adaptation of a signal received from the first node. The second node may select an information alternative from the codebook and send it to the first node to assist the first node in adapting the signal. The first node is configured with a number of subsets, each comprising a part of the possible information alternatives. The first node requests that the second node restrict the selection of information alternatives to one of the subsets, and in response, receives an information alternative from the second node that is selected from among the subsets configured according to the configuration request.

28 Claims, 2 Drawing Sheets

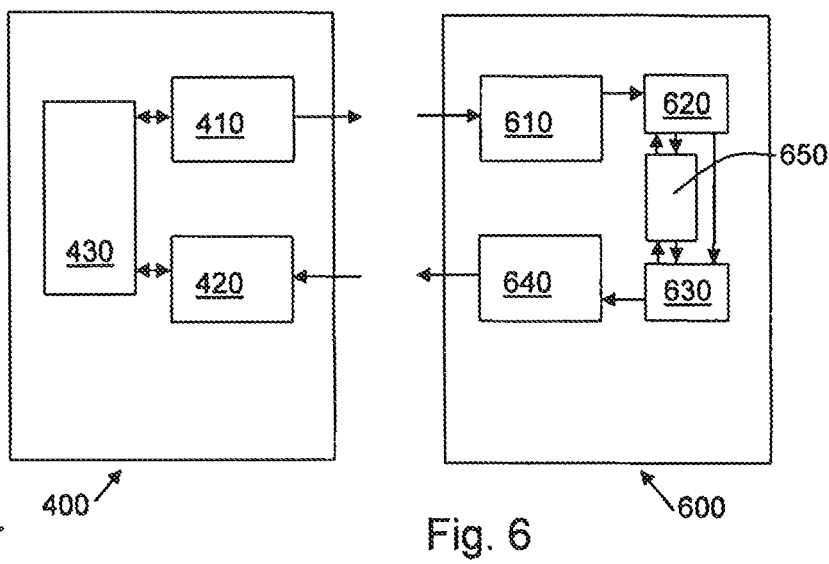
Fig. 4   400
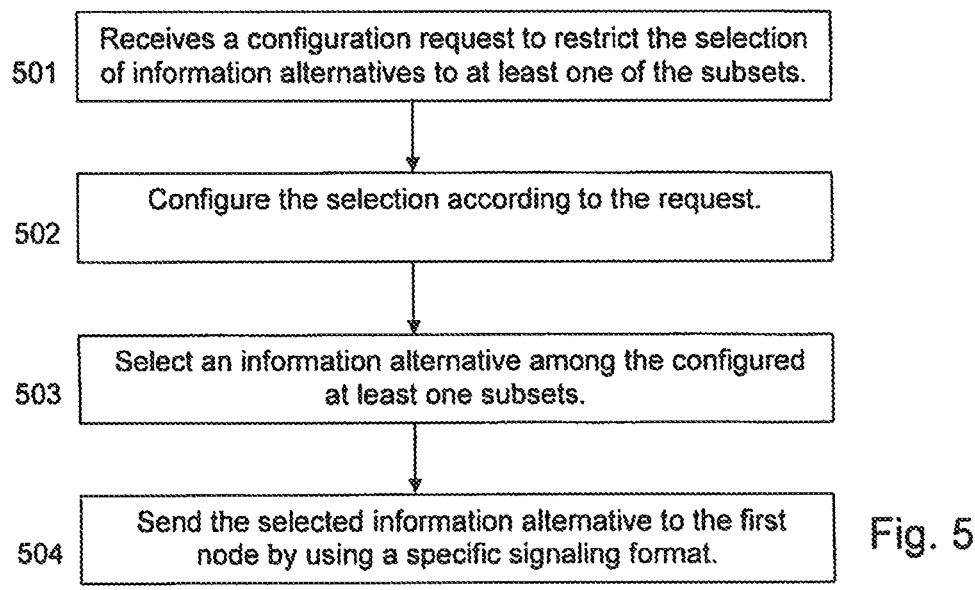
Fig. 6   600
Fig. 5

METHOD AND ARRANGEMENT IN A WIRELESS COMMUNICATIONS SYSTEM

CROSS-REFERENCE TO RELATED APPLICATIONS

This application is a continuation of U.S. application Ser. No. 12/522,851, which is the National Stage of International Application No. PCT/SE2007/050754, filed Oct. 18, 2007; which in turn claims priority from foreign application no. SE 0700062-3, filed Jan. 12, 2007. Each of the '851, '754, and '62-3 applications are expressly incorporated herein by reference in their entirety.

TECHNICAL FIELD

The present invention relates generally to a method and an arrangement in a first node in a wireless communications system and a method and an arrangement in a second node in the wireless communications system. In particular it relates to codebook subset restriction used for assisting the first node in adapting a signal to be sent from the first node to the second node over the radio link.

BACKGROUND

The use of multiple antennas at a transmitter and/or a receiver of a node in a wireless communication system can significantly boost the capacity and coverage of the wireless communication system. Such Multiple Input Multiple Output (MIMO) systems exploit the spatial dimension of the communication channel to improve performance by for example transmitting several parallel information carrying signals. By adapting the transmission to the current channel conditions, significant additional gains can be achieved. One form of adaptation is to dynamically, from one Transmission Time Interval (TTI) to another, adjust the number of simultaneously transmitted information carrying signals to what the channel can support. This is commonly referred to as (transmission) rank adaptation. Precoding is another form of adaptation where the phases and amplitudes of the aforementioned signals are adjusted to better fit the current channel properties. The signals form a vector-valued signal and the adjustment can be thought of as multiplication by a precoder matrix. A common approach is to select the precoder matrix from a finite and countable set, a so-called codebook. Such codebook based precoding is an integral part of the Long Term Evolution LTE standard and will be supported in MIMO for High Speed Downlink Packet Access (HSDPA) in Wideband Code Division Multiple Access (WCDMA) as well.

Codebook based precoding is a form of channel quantization. A typical approach (c.f. LTE and MIMO HSDPA) is to let the receiver recommend a suitable precoder matrix to the transmitter by signalling the precoder index over a feedback link. The transmitter may choose to directly use the receiver's recommendation, without modification, or to override the receiver's recommendation so signalling the precoder index actually used in the transmission to the receiver may also be needed. To limit signalling overhead, it is generally important to keep the codebook size as small as possible. This however needs to be balanced against the performance impact since with a larger codebook it is possible to better match the current channel conditions.

The design of precoding codebooks and transmission rank adaptation possibilities are a compromise in order to cover a multitude of scenarios. Thus, in certain scenarios, not all combinations of codebook element and transmission rank are beneficial to use. Still, since in practice the adaptation process is non-ideal such ill-suited combinations might be erroneously chosen and thus hurt performance in various ways. The risk for such errors may increase with codebook size and transmission rank possibilities.

The use of adaptation by means of precoding and rank adaptation typically introduces variations in the spatial properties of the transmitted signals. In cellular systems like LTE and WCDMA this can lead to bursty interference which in turn makes link adaptation as well as scheduling more challenging. This issue tends to be more problematic when the number of adaptation combinations is large than when it is small. Letting the receiver select among many different adaptation possibilities means that each possible transmission mode needs to be evaluated in order to find the optimum. This may however involve substantial computational complexity at the receiver and possibly also at the transmitter.

In LTE and WCDMA, a user equipment (UE) selects a recommended precoder and transmission rank and informs the base station, via a feedback channel, about which element in the codebook was selected. Channel Quality Indicators (CQIs) are also fed back conditioned on a certain choice of rank and precoder. The base station may choose to follow the user equipment recommendation or to override it. The problem with the latter is that it increases the CQI errors since the CQIs are computed assuming the use of the recommended precoder and rank. Thus utilizing a larger than necessary codebook and then overriding the user equipment recommendations to limit the transmission freedom, and/or correct erroneous UE selection is not an attractive approach. Using a small codebook and possibly limited rank adaptation with associated reduced signalling overhead is an obvious way of limiting the adaptation possibilities and thus alleviate the above mentioned problems. The problem is that such an approach may create a need for an unnecessarily large number of different codebooks and signalling schemes and that might be highly undesirable from a standard point of view (e.g., complicate performance testing, increase the number of options in the system).

SUMMARY

It is therefore an object of the present invention to provide a mechanism for improving the performance of a radio access network.

According to a first aspect of the present invention, the object is achieved by a method in a first node for assisting the adaptation of a signal to be sent from the first node to a second node in a wireless communication system, the first node being capable of communicating with the second node over a radio link. The second node is configured to comprise a codebook, which codebook comprises a set of possible information alternatives used for assisting the adaptation of a signal to be sent from the first node to the second node over the radio link. The second node is arranged to select an information alternative from the codebook, which selected information alternative is intended be sent to the first node to assist the first node in how to adapt the signal. The first node knows a number of subsets, each subset comprising a part of or the complete codebook. The method comprises the step of sending a message to the second node. The message comprises a configuration request to the second node to restrict the selection of information alternatives to at least one of the subsets. The method comprises the further step of receiving an information alternative from the second node. The information alternative is selected among the at least one subsets configured according to the configuration request The information alternative is conveyed from the second node to the first node by means of a specific signalling format, which specific format is possible to be reused for receiving an information alternative selected from at least one other subset.

According to a second aspect of the present invention, the object is achieved by method in a second node for assisting a first node in the adaptation of a signal to be sent from a first node to the second node in a wireless communication system. The second node is capable of communicating with the first node over a radio link. The second node is configured to comprise a codebook, which codebook comprises a set of possible information alternatives used for assisting the adaptation of a signal to be sent from the first node to the second node over the radio link. The second node is arranged to select an information alternative from the codebook, which selected information alternative is intended to be sent to the first node to assist the first node how to adapt the signal. The first node knows a number of subsets, each subset comprising a part of or the complete codebook. The method comprises the step of receiving a message from the first node. The message comprises a configuration request to restrict the selection of information alternatives to at least one of the subsets. The method further comprises the steps of configuring the selection according to the received configuration request, and selecting an information alternative among the configured at least one subsets. The method comprises the further step of sending the selected information alternative to the first node, which information alternative is conveyed from the second node to the first node by using a specific signalling format. The specific signalling format is possible to be reused for sending an information alternative selected from at least one other subset.

According to a third aspect of the present invention, the object is achieved by an arrangement in first node in a wireless communication system. The first node is arranged to communicate with a second node in the wireless communication system over a radio link. The second node is configured to comprise a codebook, which codebook comprises a set of possible information alternatives used for assisting the adaptation of a signal to be sent from the first node to the second node over the radio link. The second node is arranged to select an information alternative from the codebook. The selected information alternative is intended to be sent to the first node to assist the first node how to adapt the signal. The first node is arranged to know a number of subsets, each subset comprising a part of or the complete codebook. The first node arrangement comprises a sending unit arranged to send a message to the second node. The message comprises a configuration request to the second node to restrict the selection of information alternatives to at least one of the subsets. The first node arrangement further comprises a receiving unit arranged to receive an information alternative from the second node. The information alternative is arranged to be selected by the second node among the at least one subsets configured according to the configuration request. The information alternative is arranged to be conveyed from the second node to the first node by means of a specific signalling format. The specific signalling format is possible to be reused for receiving an information alternative selected from at least one other subset.

According to a fourth aspect of the present invention, the object is achieved by an arrangement in a second node in a wireless communication system. The second node is arranged to communicate with a first node in the wireless communication system over a radio link. The second node is configured to comprise a codebook, which codebook comprises a set of possible information alternatives used for assisting the adaptation of a signal to be sent from the first node to the second node over the radio link. The second node is arranged to select an information alternative from the codebook. The selected information alternative is intended to be sent to the first node to assist the first node how to adapt the signal. The first node is arranged to know a number of subsets, each subset comprising a part of or the complete codebook. The second node arrangement comprises a receiving unit arranged to receive a message from the first node. The message comprises a configuration request to restrict the selection of information alternatives to at least one of the subsets. The second node arrangement further comprises a configuration unit arranged to configure the selection according to the received configuration request and a selection unit arranged to select an information alternative among the configured at least one subsets. The second node arrangement further comprises a sending unit arranged to send the selected information alternative to the first node. The information alternative is arranged to be conveyed from the second node to the first node by using a specific signalling format. The specific signalling format is arranged to be reused for sending an information alternative selected from at least one other subset.

Adaptation restriction according to the present solution can help in creating more stationary interference, when e.g. the set of information alternatives correspond to a codebook of precoders and transmission ranks, since the time-variations of the transmission properties decrease. This can be beneficial since it may help in reducing burstiness of e.g. inter-cell interference. Such burstiness makes link adaptation and scheduling difficult and can thus be detrimental to performance.

A further advantage related to the previous one is that if the scheduler in the first node discovers that the adaptation information signaled from a second node is not trustworthy, it can limit the number of information alternatives to a smaller subset and thereby restrict the adaptation possibilities to improve the accuracy. This is for example the case when a codebook of precoders and transmission ranks is used. Since the CQI reporting is intimately tied to the precoder and rank selection in the second node, this provides a way for the second node to avoid overriding the second node's recommendations and thus keep the CQI and the adaptation choice in sync.

Some adaptation schemes are designed under ideal assumptions. If those assumptions are not met in some practical scenarios, then it may be beneficial to introduce an adaptation restriction according to the present solution. This is e.g. illustrated by the precoding and rank adaptation scheme in MIMO for HSDPA where for rank one transmission there are four different precoding vector/matrices. Limiting the number of precoding choices even further can for example facilitate modeling intra-cell interference and thus may improve decoding as well as CQI estimation performance.

Flexibility and efficient support for future antenna array setups in conjunction with precoder and transmission rank adaptation is yet another example of where codebook subset restriction as in the present solution may be beneficial. Some precoder elements may lead to undesirable transmission properties when combined with certain array setups. Resulting beam patterns may for example distribute the transmitted energy in directions which create interference to other users, making inter-cell interference coordination techniques more difficult.

BRIEF DESCRIPTION OF THE DRAWINGS

FIG. 4 is a schematic block diagram illustrating an embodiment of a first node arrangement.

FIG. 5 is a flow chart illustrating embodiments of a method in a second node.

FIG. 6 is a schematic block diagram illustrating an embodiment of a second node arrangement.

DETAILED DESCRIPTION

The invention is defined as a method and an arrangement which may be put into practice in the embodiments described below.

Figure 1:
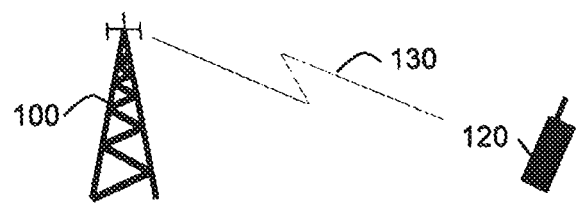
FIG. 1 is a schematic block diagram illustrating embodiments of a wireless communication system.

FIG. 1 depicts a first node 100 in a wireless communication system 110. The wireless communication system 110 may be a cellular system and/or a system such as e.g. Long Term Evolution (LTE), Evolved-Universal Terrestrial Radio Access (E-UTRA), Worldwide Interoperability for Microwave Access (WiMAX), Universal Terrestrial Radio Access (UTRA), Wideband Code Division Multiple Access (WCDMA), GSM, Ultra Mobile Wideband (UMB) or any other wireless communication system using technologies that perform adaptation between different forms of transmission. The first node 100 is capable of communicating with a second node 120 in the wireless communication system 110 over a radio link 130. The first node 100 may be any type of a base station such as e.g. a NodeB as in LTE. The second node 120 may be a user equipment (UE) such as e.g. a mobile phone, a Personal Digital Assistant (PDA). It may also be the other way around, that the first node 100 may be a UE such as e.g. a mobile phone, a Personal Digital Assistant (PDA) and the second node 120 may be any type of a base station such as e.g. a NodeB. In the example of FIG. 1, the first node 100 is a base station and the second node 120 is a user equipment. In addition, the first node 100 and the second node 120 may constitute arbitrary wireless devices in communication with each other and with no particular hierarchical ordering.

The first node 100 and the second node 120 may use multiple antennas at its respective transmitter and/or receiver such as is the case e.g. a MIMO system.

The second node 120 is configured to comprise a codebook, which codebook comprises a set of possible information alternatives to be used for assisting the adaptation of a signal to be sent from the first node 100 to the second node 120 over the radio link 130. The codebook may e.g. comprise precoder matrices, transmission ranks, modulation choices, transport block sizes, powers and/or channelization codes etc., or combinations thereof. In some embodiments the codebook comprises one or several precoders and one or several transmission ranks while in some embodiments the codebook comprises only precoders. A codebook may contain one or several precoder matrices, also each implicitly describing transmission rank. A particular precoder matrix may correspond to one information alternative. In general, the codebook comprises a countable set of elements, where each element may affect the adaptation. One way of affecting the adaptation is to let the first node 100 adjusts its transmission parameters exactly as specified by the information alternative. Another approach would be to perform some kind of processing of the information alternatives, e.g. filtering, and use the result in adjusting the transmission parameters. The second node 120 may select an information alternative from the codebook. In general one information alternative is selected, but also more information alternatives may be selected in combination, but this may be thought of as using a larger codebook where combinations of information alternatives from the smaller codebook together form separate codebook elements. The selected information alternative is then to be reported, i.e. sent to the first node 100 and is intended to assist the first node 100 in how to adapt a signal to be sent from the first node 100 to the second node 120.

The first node 100 knows a number of subsets, each subset comprising a part of or the complete codebook. To improve the performance and support additional flexibility, the present solution provides a possibility to restrict selection of information alternative in second node 120 to a subset of the set of all possible information alternatives, e.g. to restricting adaptation to only a subset of all precoder matrix and rank combinations even though codebook size and signalling support is tailored for a larger set of combinations. The different subsets may be designed in many different ways. For example, a subset may based on system simulations be designed to match certain channel scenarios and deployments of wireless devices so that performance is optimized. Alternatively, the first node 100 may study the information alternatives obtained from the second node 120 and restrict the selection to a subset when it deems the second node 120 to perform selection of information alternative in an unreliable manner. Detecting such unreliable behaviour is simplified in situations where the first node 100 can be relatively sure that the reporting of selected information alternatives fluctuates too rapidly, such as e.g. in scenarios with closely spaced antennas and small angular spread at first node 100, meaning reported precoder should change relatively slowly as it is supposed to match the wireless channel's correlation properties, which tend to be of long-term nature.

As an illustrative example, a simple precoder codebook for a 2×2 MIMO system is depicted in Table 1. The notation N×M means N antennas at the first node 100 and M antennas at the second node 120. As seen, there are separate precoder elements for the two possible transmission ranks (Tx Rank). Transmission rank here corresponds to the number of uncorrelated symbol streams the transmission from first node 100 to the second node 120 is using. Codebook structures roughly similar to those displayed are part of MIMO for HSDPA in WCDMA and may also be used in LTE. Based on measurements of the channel properties at the second node 120, the transmission rank and precoder element are selected. Since the channel properties are time-varying in a typical scenario with some mobility, the transmission characteristics may vary at the same rate. In NANO HSPDA or in LTE, this may be on the order of once per TTI i.e. 2 ms in the former and 1 ms in the latter.

TABLE 1

| Tx Rank | Codebook per Rank |
|---|---|
| 1 | $\begin{bmatrix}1\\0\end{bmatrix}, \begin{bmatrix}0\\1\end{bmatrix}, \begin{bmatrix}1\\\exp(j2\pi k/4)\end{bmatrix}, k = 0, \ldots, 3$ |
| 2 | $\begin{bmatrix}1 & 0\\0 & 1\end{bmatrix}$ |

Even though the first node 100 may adapt the transmission according to all the different combinations of precoder and rank, a further restriction of the second node's 120 selection of precoder matrix and transmission rank is provided according to the present solution. An example of a possible subset is to only allow the transmitter and the receiver to use the single element for transmission rank two in Table 1. This would serve to stabilize the transmission properties since otherwise the use of the rank one element may create fast fluctuations of the spatial properties of the transmission which in turn may introduce interference predictability problems for other co-channel users of the wireless propagation medium and in the end hurt their performance. In a typical cellular system, the fluctuating interference would correspond to inter-cell interference while the suffering co-channel users would correspond to the use of a link in the own cell.

An advantage of the present solution is for scenarios in which the channel has certain long-term properties that are in line with a subset of the adaptation possibilities. In such situations, the number of erroneous decisions in the adaptation selection can potentially be reduced if the selection is only among elements which are appropriate for these long-term properties. Again taking Table 1 as an example, this codebook is primarily intended for a setup in which both the transmitter in the first node 100 and the receiver in the second node 120 are equipped with spatially separated antennas. However, by restricting the adaptation to the first two rank-one elements (the two unit vectors) and the single rank two elements, the adaptation becomes specifically tailored for a different antenna setup with cross-polarized antennas at both sides of the link. Such a restriction can be done without affecting the other parts of the control signaling required to support the adaptation. This is a distinct advantage since it often is non-trivial to add or change a control signaling scheme in a standard but use a subset of the adaptation possibilities is easier.

The restriction of the selection of information alternatives to at least one of the subsets according to the present solution must not be confused with the conventional way of restricting the number of information alternatives. In the latter approach, the signalling format used for conveying the selected information alternative from the second node 120 to first node 100 is tailored to the reduced set of information alternatives, effectively creating a new codebook with associated signalling. The present invention restricts the selection process in the second node 120 without affecting the signalling format, thus allowing the same signalling format to be reused for several different subsets.

Figure 2:
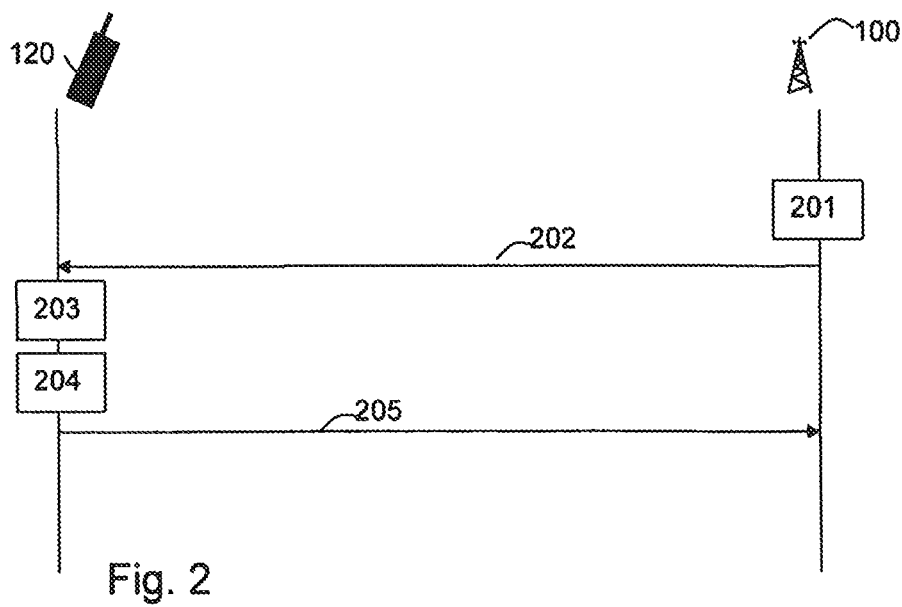
FIG. 2 is a combined flowchart and signalling diagram illustrating exchange of signals in an embodiment of a wireless communication system.

To support the codebook subset restriction, the selected subset must somehow be signalled so that both the first node 100 and the second node 120 agree on the exact properties of the restriction. In LTE or in MIMO HSDPA this may for example be accomplished using higher layer signalling procedures, e.g. Radio Resource Control (RRC) or Medium Access Control (MAC) element, or possibly be signalled on some broadcast control channel. The first node 100 would then determine on what kind of restriction to use. The overhead incurred by the needed signalling is typically negligible since it should be sufficient to update the adaptation restriction on a very slow basis. FIG. 2 illustrates a combined flowchart and signalling scheme of some embodiments according to the present solution.

201. The first node 100 knows a number of subsets of information alternatives, which potentially may be all different subsets of a codebook. The first node 100 determines which at least one subset from the number of subsets to request the second node 120 to restrict to. Which subset to be determined may be based on deployment scenario and/or reliability analysis in the first node 100 of the second node 120 reporting to the first node 100. It may also be determined by a search for the "best" subset by trying different ones and selecting the one which maximizes a performance metric, e.g. system throughput.

202. The first node 100 sends a message to the second node 120. The message comprises a configuration request to restrict the selection of information alternatives to at least one of the subsets determined under step 201. The configuration request may e.g. comprise a bit map where each bit represents a certain information alternative and where a bit value of one would mean include in subset and a bit value of zero would mean exclude in subset.

203. The second node 120 performs the configuration according to the received configuration request.

204. The second node 120 then selects an information alternative among the configured at least one subsets. In the case of a codebook containing precoders and transmission rank, an element may be selected that optimizes some performance metric, e.g. predicted link throughput.

205. The second node 120 sends the selected information alternative to the first node 100. This is performed by sending the information alternative using a specific signalling format. The signalling format may typically involve certain bits that include signalling of the information alternative. The specific signalling format is possible to be reused for sending an information alternative selected from at least one other subset. Typically, several subsets can reuse the same signalling format. Such reuse is a distinct advantage since it reduces the number of different signalling formats that need to be designed, implemented and tested.

Figure 3:
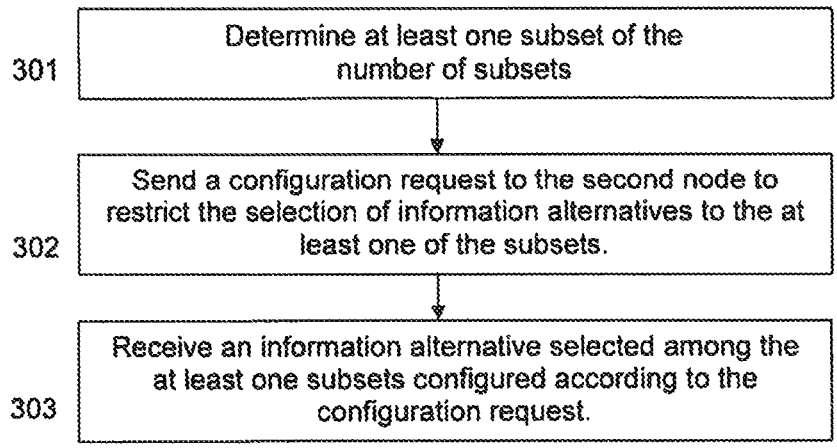
FIG. 3 is a flow chart illustrating embodiments of a method in a first node.

The method steps in the first node 100 for assisting the adaptation of a signal to be sent from the first node 100 to the second node 120 in the wireless communication system 110, according to some embodiments will now be described with reference to a flowchart depicted in FIG. 3. The first node 100 is capable of communicating with the second node 120 over a radio link. The second node 120 is configured to comprise a codebook used for assisting the adaptation of a signal to be sent from the first node 100 to the second node 120 over the radio link. The codebook may comprise precoder matrices, transmission ranks, modulation choices, transport block sizes, powers and/or channelization codes. In some embodiments the codebook comprises one or several precoders, or comprises one or several precoders and one or several transmission ranks, or combinations thereof. The second node 120 is arranged to select an information alternative from the codebook, which selected information alternative is intended to be sent to the first node 100 to assist the first node 100 how to adapt the signal. The first node 100 knows a number of subsets, each subset comprising a part of or the complete codebook. In some embodiments the first node 100 is a base station and in some embodiments the first node 100 is a user equipment.

The method comprises the steps of:

301. The first node 100 may determine which at least one subset of the number of subsets, to request the second node 120 to restrict to. This may be performed based on deployment scenario and/or reliability analysis in the first node 100 of the second node 120 reporting to the first node 100. This may further be performed searching for the "best" subset by trying different subsets and selecting the one which maximizes a performance metric.

302. A message is sent to the second node 120. The message comprises a configuration request to the second node 120 to restrict the selection of information alternatives to at least one of the subsets, which at least one of the subsets may be selected in the step above. The configuration request may comprise a bit map where each bit corresponds to a certain information alternative and where the bit value may indicate whether to include or exclude the information alternative in the subset.

303. An information alternative is received from the second node 120. The information alternative is selected among the at least one subsets configured according to the configuration request. The information alternative is conveyed from the second node 120 to the first node 100 by means of a specific signalling format. The specific format is possible to be reused for receiving an information alternative selected from at least one other subset. In some embodiments, the specific signalling format comprises certain bits that include signalling of the information alternative.

To perform the method steps above, the first node 100 comprises an arrangement 400 depicted in FIG. 4. In some embodiments the first node 100 is a base station and in some embodiments the first node 100 is a user equipment.

The first node arrangement 400 comprises a sending unit 410 arranged to send a message to the second node 120. The message comprises a configuration request to the second node 120 to restrict the selection of information alternatives to at least one of the subsets.

The first node arrangement 400 further comprises a receiving unit 420 arranged to receive an information alternative from the second node 120. The information alternative is arranged to be selected by the second node 120 among the at least one subsets configured according to the configuration request. The information alternative is arranged to be conveyed from the second node 120 to the first node 100 by means of a specific signalling format, which specific format is possible to be reused for receiving an information alternative selected from at least one other subset.

The method steps in the second node 120 for assisting the first node 100 in adapting a signal to be sent from the first node 100 to the second node 120 in a wireless communication system 110, according to some embodiments will now be described with reference to a flowchart depicted in FIG. 5. The second node 120 is capable of communicating with the first node 100 over a radio link. The second node 120 is configured to comprise a codebook, which codebook comprises a set of possible information alternatives used for assisting the adaptation of a signal to be sent from the first node 100 to the second node 120 over the radio link. The second node 120 is arranged to select an information alternative from the codebook. In some embodiments the codebook comprises precoder matrices, transmission ranks, modulation choices, transport block sizes, powers and/or channelization codes. In some embodiments the codebook comprises one or several precoders or, comprises one or several precoders and one or several transmission ranks or combinations thereof. The selected information alternative is intended to be sent to the first node 100 to assist the first node 100 how to adapt the signal. The first node 100 knows a number of subsets, each subset comprising a part of or the complete codebook. In some embodiments the second node 120 is a user equipment and in some embodiments the first node 100 is a base station. The method comprises the steps of:

501. The second node 120 receives a message from the first node 100. The message comprises a configuration request to restrict the selection of information alternatives to at least one of the subsets.
502. The second node 120 configures the selection according to the received configuration request.
503. The second node 120 selects an information alternative among the configured at least one subsets. In some embodiments the codebook comprises one or several precoders and one or several transmission ranks, or combinations thereof. In these embodiments this step may be performed by selecting an element in the subset that optimizes a performance metric.
504. The second node 120 sends the selected information alternative to the first node 100. The information alternative is conveyed from the second node 120 to the first node 100 by using a specific signalling format, which specific format is possible to be reused for sending an information alternative selected from at least one other subset. In some embodiments the specific signalling format comprises certain bits that include signalling of the information alternative.

To perform the method steps above, the second node 120 comprises an arrangement 600 depicted in FIG. 6. In some embodiments the second node 100 is a user equipment and in some embodiments the second node 120 is a base station.

The second node arrangement 600 comprises a receiving unit 610 arranged to receive a message from the first node 100. The message comprises a configuration request to restrict the selection of information alternatives to at least one of the subsets.

The second node arrangement 600 further comprises a configuration unit 620 arranged to configure the selection according to the received configuration request.

The second node arrangement 600 further comprises a selection unit 630 arranged to select an information alternative among the configured at least one subsets.

The second node arrangement 600 further comprises a sending unit 640 arranged to send the selected information alternative to the first node 100. The information alternative is arranged to be conveyed from the second node 120 to the first node 100 by using a specific signalling format, which specific signalling format is arranged to be reused for sending an information alternative selected from at least one other subset.

The present mechanism for assisting the first node 100 in adapting a signal to be sent from the first node 100 to the second node 120 may be implemented through one or more processors, such as a processor 430 in the first node arrangement 400 depicted in FIG. 4 or the processor 650 in the second node arrangement 600 depicted in FIG. 6, together with computer program code for performing the functions of the present solution. The program code mentioned above may also be provided as a computer program product, for instance in the form of a data carrier carrying computer program code for performing the present solution when being loaded into the first node 100 or the second node 120. One such carrier may be in the form of a CD ROM disc. It is however feasible with other data carriers such as a memory stick. The computer program code can furthermore be provided as pure program code on a server and downloaded to first node 100 or second node 120 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first node for adapting of a signal to be sent over a radio link from the first node to a second node in a wireless communication system, wherein the second node is configured to use a codebook comprising a set of possible information alternatives for use by the first node in adapting the signal, said method comprising:

sending a message to the second node comprising a configuration request, wherein the configuration request indicates at least one of a number of subsets of the set of possible information alternatives to the second node, and restricts selection of information alternatives by the second node to the at least one of the subsets, and wherein each subset of the set of possible information alternatives comprises at least a part of the codebook; and receiving an information alternative from the second node, which information alternative is selected from among the at least one of the subsets indicated by the configuration request.

2. The method of claim 1, further comprising determining the at least one of the subsets from the number of subsets to use for restricting information alternative selection by the second node.

3. The method of claim 2, wherein said determining is based on at least one of a deployment scenario and a reliability analysis, in the first node of the second node reporting to the first node.

4. The method of claim 2, wherein the step of determining is performed by searching for a subset by trying different subsets and selecting the one which maximizes a performance metric.

5. The method of claim 1, wherein the configuration request comprises a bit map where each bit corresponds to a certain information alternative.

6. The method of claim 1, wherein the configuration request comprises a bit map and wherein the value of each bit in the bit map indicates whether to include or exclude a corresponding information alternative in the at least one of the subsets.

7. The method of claim 1, wherein said receiving the information alternative includes receiving the information alternative according to a specific signalling format that comprises certain bits that signal the information alternative.

8. The method of claim 1, wherein the codebook comprises one or several precoders, or comprises one or several precoders and one or several transmission ranks, or combinations thereof.

9. The method of claim 1, wherein the codebook comprises at least one of: a precoder matrix, a transmission rank, a modulation choice, a transport block size, a power, and a channelization code.

10. The method of claim 1, wherein the first node is a base station.

11. The method of claim 1, wherein the first node is a user equipment.

12. The method of claim 1, wherein said receiving the information alternative comprises receiving the information according to a specific signalling format suitable for receiving an information alternative selected from at least one other subset that is of a different size than the at least one of the subsets.

13. A method in a second node for assisting a first node in the adaptation of a signal to be sent over a radio link from the first node to the second node in a wireless communication system, wherein the second node is configured to use a codebook comprising a set of possible information alternatives for use by the first node in adapting the signal, said method comprising:

receiving a message from the first node, the message comprising a configuration request indicating at least one of a number of subsets of the set of possible information alternatives to the second node and restricting the selection of information alternatives by the second node to the at least one of the subsets, wherein each subset of the set of possible information alternatives comprises at least a part of the codebook;

selecting an information alternative from among the at least one of the subsets indicated by the configuration request; and sending the selected information alternative to the first node.

14. The method of claim 13, wherein the codebook comprises one or several precoders, or comprises one or several precoders and one or several transmission ranks, or combinations thereof, and wherein said selecting an information alternative comprises selecting an element in the subset that optimizes a performance metric.

15. The method of claim 13, wherein the codebook comprises a precoder, or comprises a precoder and a transmission rank.

16. The method of claim 13, wherein the codebook comprises at least one of: a precoder matrix, a transmission rank, a modulation choice, a transport block size, a power, and a channelization code.

17. The method of claim 13, wherein said sending comprises sending the selected information alternative to the first node using a specific signaling format wherein certain bits signal the information alternative.

18. The method of claim 13, wherein the second node is a user equipment.

19. The method of claim 13, wherein the second node is a base station.

20. The method of claim 13, wherein said sending comprises sending the selected information alternative to the first node using a specific signaling format suitable for sending an information alternative selected from at least one other subset that is of a different size than the at least one of the subsets.

21. A first node in a wireless communication system that is configured to communicate over a radio link with a second node in the wireless communication system, wherein the second node is configured to use a codebook comprising a set of possible information alternatives for use by the first node in adapting a signal to be sent from the first node to the second node over the radio link, said first node comprising:

a transmitter configured to send a message to the second node, the message comprising a configuration request indicating at least one of a number of subsets of the set of possible information alternatives to the second node, and restricting selection of information alternatives by the second node to the at least one of the subsets, and wherein each subset of the set of possible information alternatives comprises at least a part of the codebook; and a receiver configured to receive an information alternative from the second node that was selected by the second node from among the at least one of the subsets as indicated by the configuration request.

22. The first node of claim 21, wherein the first node is a base station.

23. The first node of claim 21, wherein the first node is a user equipment.

24. The first node of claim 21, wherein the receiver is configured to receive the information alternative according to a specific signalling format suitable for receiving an information alternative selected from at least one other subset that is of a different size than the at least one of the subsets.

25. A second node in a wireless communication system, the second node configured to communicate with a first node in the wireless communication system over a radio link, and wherein the second node is configured to use a codebook comprising a set of possible information alternatives for use by the first node in adapting a signal to be sent from the first node to the second node over the radio link, said second node comprising:
- a receiver configured to receive a message from the first node, the message comprising a configuration request indicating at least one of a number of subsets of the set of possible information alternatives to the second node, and restricting selection of information alternatives by the second node to the at least one of the subsets, wherein each subset of the set of possible information alternatives comprises at least a part of the codebook;
- a processor circuit configured to:
   - select an information alternative from among the at least one of the subsets indicated by the configuration request; and
- a transmitter configured to send the selected information alternative to the first node.

26. The second node of claim 25, wherein the second node is a user equipment.

27. The second node of claim 25, wherein the first node is a base station.

28. The second node of claim 25, wherein the transmitter is configured to send the selected information alternative to the first node using a specific signalling format suitable for sending an information alternative selected from at least one other subset that is of a different size than the at least one of the subsets.

* * * * *

UNITED STATES PATENT AND TRADEMARK OFFICE
CERTIFICATE OF CORRECTION

PATENT NO.       : 9,059,762 B2                                     Page 1 of 1
APPLICATION NO.  : 14/275699
DATED            : June 16, 2015
INVENTOR(S)      : J☐ngren et al.

It is certified that error appears in the above-identified patent and that said Letters Patent is hereby corrected as shown below:

In the specification

Column 1, Line 8, delete "12/522,851," and insert -- 12/522,851, filed July 10, 2009, now Pat. No. 8,724,543, --, therefor.

Column 1, Line 9, delete "2007;" and insert -- 2007, --, therefor.

Column 6, Line 49, delete "NANO HSPDA" and insert -- MIMO HSDPA --, therefor.

Column 10, Line 15, delete "second node 100" and insert -- second node 120 --, therefor.

In the claims

Column 13, Line 21, Claim 27, delete "the first node" and insert -- the second node --, therefor.

Signed and Sealed this
Twenty-fourth Day of May, 2016

Michelle K. Lee
*Director of the United States Patent and Trademark Office*